US008396698B2

(12) United States Patent
Petersik et al.

(10) Patent No.: US 8,396,698 B2
(45) Date of Patent: Mar. 12, 2013

(54) METHOD FOR THE SIMULATION OF THE HAPTIC OF AN INTERACTION OF A GUIDED OBJECT WITH A VIRTUAL THREE-DIMENSIONAL OBJECT

(75) Inventors: Andreas Petersik, Hamburg (DE);
Karl-Heinz Hohne, Pinneberg (DE);
Bernhard Pflesser, Hamburg (DE);
Andreas Pommert, Buxtehude (DE);
Ulf Tiede, Wentorf (DE)

(73) Assignee: Universitatsklinkum Hamburg-Eppendorf, Hamburg (DE)

( * ) Notice: Subject to any disclaimer, the term of this patent is extended or adjusted under 35 U.S.C. 154(b) by 1255 days.

(21) Appl. No.: 12/151,306

(22) Filed: May 6, 2008

(65) Prior Publication Data

US 2009/0006043 A1 Jan. 1, 2009

(30) Foreign Application Priority Data

May 6, 2007 (DE) .................. 10 2007 021 348

(51) Int. Cl.
*G06F 17/50* (2006.01)
*G06F 7/48* (2006.01)
*G06F 17/00* (2006.01)
*G06T 15/00* (2011.01)
*G06T 17/00* (2006.01)
*G09G 5/00* (2006.01)

(52) U.S. Cl. ............... 703/6; 703/1; 345/418; 345/419; 345/420; 345/586

(58) Field of Classification Search .................. 703/1, 6; 345/418, 419, 420, 586
See application file for complete search history.

(56) References Cited

U.S. PATENT DOCUMENTS

| 6,552,722 | B1 | 4/2003 | Shih et al. | |
|---|---|---|---|---|
| 6,839,663 | B1 * | 1/2005 | Temkin et al. | ................ 703/13 |
| 7,710,415 | B2 * | 5/2010 | Jennings et al. | ............. 345/420 |
| 7,990,374 | B2 * | 8/2011 | Itkowitz et al. | ............... 345/419 |
| 2002/0089500 | A1 * | 7/2002 | Jennings et al. | ............. 345/420 |
| 2006/0109266 | A1 * | 5/2006 | Itkowitz et al. | ............... 345/419 |
| 2006/0142657 | A1 * | 6/2006 | Quaid et al. | ................. 600/424 |

OTHER PUBLICATIONS

Zilles et al. "A Constrained-based God-object Method for Haptic Display", Proceedings of the International Conference on Intelligent Robots and Systems, vol. 3, p. 3146, Aug. 5-9, 1995.
McNeely et al. "Six Degree-of-Freedom Haptic Rendering Using Voxel Sampling", Proc. of ACM Siggraph, pp. 401-408, 1999.
Petersik et al. "Haptic Volume Interaction with Anatomic Models at Sub-Voxel Resolution", 10th Int. Symposium on Haptic Interfaces for Virtual Environment and Teleoperator Systems; Proc. Haptics 2002, Orlando FL, pp. 66-72, 2002.
Petersik, Andreas "Realistische haptische Simulation materialabtragender chirurgischer Eingriffe" (Realistic haptic simulation of material-removing surgical procedures), vol. 11, Shaker Verlag, Aachen 2007 at the same time dissertation, Carl-Friedrich-Gauβ-Fakultät, TU Braunschweig (Document includes 119 pages in German, with English Language abstract on pp. 9-10).

(Continued)

*Primary Examiner* — Omar Fernandez Rivas
*Assistant Examiner* — Nithya Janakiraman
(74) *Attorney, Agent, or Firm* — Locke Lord LLP; Alan B. Clement; Peter J. Fallon

(57) ABSTRACT

The object of the instant invention is a method for simulating the haptics of an interaction of an object guided by a user, hereinafter referred to as tool, with a virtual three-dimensional object, in particular the scanning of the surface of the simulated object and/or the penetration of the guided object into the simulated object, under material removal, if applicable.

13 Claims, 3 Drawing Sheets

OTHER PUBLICATIONS

Petersik et al. "Realistic Haptic Interaction in Volume Sculpting for Surgery Simulation" in: Nicholas Ayache, Hervé Delingette (eds): Surgery Simulation and Soft Tissue Modeling, Pc. IS4TM 2003, lecture Notes in Computer Science 2673, Springer Verlag, Berlin, pp. 194-202, 2003.

Lundin et al. "The Orthogonal Constraints Problem with the Constraint Approach to Proxy-based Volume Haptics and Solution", in: SIGRAD 2005 The Annual SIGRAD Conference Special Theme—Mobile Graphics Nov. 23-24, Lund, Sweden, 2005.

* cited by examiner

METHOD FOR THE SIMULATION OF THE HAPTIC OF AN INTERACTION OF A GUIDED OBJECT WITH A VIRTUAL THREE-DIMENSIONAL OBJECT

The instant invention relates to a method for simulating the haptics of an interaction of an object guided by a user, referred to hereinbelow as tool, with a virtual three-dimensional object, in particular the scanning of the surface of the simulated object and/or the penetration of the guided object into the simulated object, under material removal, if applicable.

An example of use is the simulation of drilling and milling in surgery, whereby a user with a virtual tool, guided by an input device with force feedback, interacts with a computer-graphic volume model. The virtual surgery thereby appears to the observer on the screen as a real time frame rate (e.g. with approx. 25 images/sec). To embody this interaction as realistically as possible, the haptics, thus rendering structures to be tangible, is also required in real time (haptic rendering) in addition to the visualization. For this purpose, corresponding computer periphery, so-called force feedback devices are available, which transmit the hand movements of a user to the computer and which transmit forces, which are created, e.g., by the collision of the tool with a virtual object, to the user.

The following problems arise in response to the simulation of the above processes:

Object penetrations of the tool guided by the user, which can occur in the virtual world, must be detected and corresponding positions of the tool, which would have been attained in reality, must be computed. The force feedback device must then be pushed to this position in that a corresponding reset force acts on the force feedback device, which guides the tool.

The forces created in response to the removal of material must be computed and must be transmitted to the user.

Commercially available force feedback devices are limited with reference to their abilities, because a human user can easily overcome the force generated by the devices, which leads to unrealistically large penetrations with respect to the object penetration and thus to a "slip-through" through virtual objects and which signifies a material removal, which is too quick and which thus does not correspond to reality in response to the simulation of a material removal.

To avoid the penetration of virtual objects in response to haptic rendering, different methods were developed, which introduce an additional virtual object (proxy), which cannot penetrate other objects (Zilles, C.; Salisbury, J. K.; "A constraint-based god object method for haptics display"; in: Proc. Of IEEE/RSJ 1995).

According to McNeely et al. (McNeely W. A., Puterbaugh K. D., Troy J. J.: "Six degree-of-freedom haptic rendering using voxel sampling" in Proc. Of ACM SIGGRAPH, pages 401-408, 1999), the tool is represented by points and vectors. For the detection of collision in the volume model, the points are checked for collision and the distance along the vectors to the center of the next voxel is defined in a direction given by the tool representation. The average of all of the defined distance vectors is then formed, so as to thus define a force for the force feedback device. This method only works well for very small penetrations of the object by means of the tool, because the defined distances are too small in response to larger penetrations. Additionally, the computed forces must be smoothed greatly because considerable force irregularities occur in response to the averaging of the distance vectors due to the voxel considered as a whole and due to the discrete number of contact points. A volume modification of the object, for instance a material removal, is also not described with this method.

Based on the tool representation of McNeely, Petersik et al. (Petersik, A.: Pflesser, B.; Tiede, U.; Höhne, K. H.; Leuwer, R. (2002); "Haptic volume interaction with anatomic models at sub-voxel resolution" in: $10^{th}$ Int. Symposium on Haptic Interfaces for Virtual Environment and Teleoperator Systems, Proc. Haptics 2002. Orlando, Fla., 66-72) presented a method, which searches for the exact location of the object surface for each vector of the tool via a bisection along the vector. The method can thus also compute a penetration-free position even for larger penetrations of tool and object. To now approximate the penetration depth of tool and object as accurately as possible, the found vectors do not form an average, as is the case with McNeely et al., because said average is greatly dependent on the number of the colliding points P; instead, the so-called projection method was introduced, which projects each individually found distance vector to the sum vector of all of the found distance vectors. The longest projection leads to a highly accurate approximation of the penetration depth of tool and object.

A force for the force feedback device is not directly defined from the penetration depth, which is determined in such a manner. Instead, a proxy is also used here in the volume model for the first time, wherein the position of the proxy results from the computed penetration-free position at the object surface. If the penetration of tool and object is so large that it is no longer possible to find a surface for one or a plurality of the vectors, the path between current position of tool and proxy is cut in half and a new computational attempt is made there. This can be repeated as often as required up to a specified iteration depth until finally a new position can be computed at the surface, to which the proxy is then set. In the event that a new computation is also not possible even at the last iteration position, the proxy remains in its old position.

The method of Petersik et al. allows for the accurate computation of penetration depth and direction of an expanded tool and objects in the volume model, which leads to a realistic haptic surface rendering; furthermore, a method, which can simulate the forces created in response to the material removal, is also implemented here.

The above-described state of the art supplies interesting attempts. However, unsolved problems remain, which render the haptic rendering to be unrealistic to the user in certain situations. These are in particular:

Thin objects can be "pushed through" by means of a greater effort, because, with thin objects and greater pressure, the points rapidly reach the clearance behind the object and thus no longer contribute in computing the surface position or can even cause a force in the wrong direction.

The iterative search for a computing position for the new proxy between old proxy and TCP is highly extensive with reference to computing time.

The material removal takes place too rapidly when the force of the force feedback device is not sufficient for keeping the user from penetrating the material.

To solve the object, which is posed to the person of skill in the art from the above-described state of the art, the invention provides for a method as defined by claim 1 and 10. Preferred embodiments are the object of the respective subclaims or are described below.

The objects, which are to be processed or scanned, are three-dimensional with regard to the regions, which are to be processed, not only with regard to their surface, but are also defined with regard to the inner space, which is to be penetrated by means of the tool. This can take place by means of a volume model comprising a plurality of voxels (volume elements) or by means of mathematical functions, such as implicit functions, for example. The method according to the invention can thus be applied to objects defined by mathematical functions, such as implicit functions or to objects defined by a plurality of voxels. For the most part, three-dimensional medical data are available in the form of voxels. The instant invention thus relates in particular to such volume data consisting of a plurality of voxels. Preferably, the three-dimensional object represents the body's own structures.

In a volume model based on voxels, it can be determined at arbitrary positions within the volume, whether an object or clearance is available there by means of a direct access to the three-dimensional voxel raster by means of object marks, which are connected to the voxels.

Preferably, the tool is a representation of a tool as it is used in surgical procedures.

Preferably, the tool is illustrated by means of polygonal data, which are common in computer graphics. For the haptic rendering, the tool is defined by a plurality of points on the surface thereof (see FIG. 1). As a rule, however, it is only necessary to correspondingly provide the active region of the tool with points. The active region is the region of the tool, which can/is to come into contact with the object during the method according to the invention. With reference to the real tool, it is a drill head, e.g., but not the shaft.

A vector $n_i$ is assigned to each point $P_i$ on the surface of the tool. The vector $n_i$ runs on the surface normal through $P_i$ and in the direction towards the interior of the tool. The length of the vectors $n_i$ is determined in response to the creation of the tool. With reference to its dimension, the size of the vector is a length. Direction and length are chosen in such a manner that the end point of the vector is always arranged within the tool. With a spherical tool, the length is preferably maximally half of the diameter of the sphere. Each tool encompasses at least 4 points $P_{i(1-4)}$ and vectors $n_{i(1-4)}$. Typically, however, these are at least 30 or even 40 to 1000 points and vectors.

The following method is used for defining a penetration of an object by means of a tool: At the onset of the method, a copy of the tool is created next to the tool, which will be referred to as proxy hereinbelow. The proxy is a virtual object and the identical duplication of the tool and of the active region of the tool, respectively. The proxy itself cannot penetrate the object or the other object, respectively. In addition to the TCP, the penetration of the object is permitted only for an intermediate position of the proxy ($proxy_{intermediate}$), which only serves the purpose of computing the actual proxy position.

The position of the tool is defined by the TCP (tool center point), wherein the tool is defined for computing the tool via the TCP in its three-dimensional expansion as well using the corresponding functions. The proxy is defined accordingly by means of the PCP (proxy center point). In response to the start of the method, the tool is without direct object contact and it is sensible to allow the proxy and tool position to coincide.

As defined by the PCP, the proxy position is newly codified in each time step, wherein the new position of the PCP $T_0$ results from the position of the PCP at the point $T_{-1}$ and of the tool at the point in time $T_0$ as follows. The position of the proxy at the point in time $T_{-1}$ is maximally displaced to TCP $T_0$ by the length $n_i$ on the connecting line PCP $T_{-1}$, thus resulting in a new position PCP $T_{0\ intermediate}$. The position PCP $T_{0\ intermediate}$ is furthermore modified as follows, wherein the following case differentiation is carried out in advance: when at least one end point of a vector $n_i$ is located within the object, the proxy position $T_{-1}$ is accessed and the position PCP $T_0$ is defined as PCP $T_{-1}$. Otherwise, the position PCP $T_0$ of the proxy is computed anew.

Contrary to the methods known from literature, such as, e.g., Petersik et al., each of the vectors $n_i$ of the proxy $T_{0\ intermediate}$ is scanned for newly computing the position PCP $T_0$, starting at the vector end point, preferably gradually starting at the end point of the vector in the direction towards the point $P_i$ until a point and first point, respectively, is found as point of intersection with the surface and with reference to the preference alternative with the uppermost/first surface of the object which is to be dipped, with reference to the tool. This thus leads to a penetration depth vector $s_i$ for all of the points $P_i$, which describes the distance of the point $P_i$ to the object surface (FIG. 2) along the vector $n_i$ and which encompasses the direction of the vector $n_i$.

In the event that no surface is found and the point $P_i$ is reached in response to searching the vector $n_i$, a zero vector follows for the penetration depth vector $s_i$ so that the corresponding penetration depth vector $s_i$ does not influence the computation.

A reset vector s is computed from the penetration vectors $s_i$. The reset vector s can be determined by the projection method, the vector addition of the penetration vectors $s_i$ or the averaging method (vector addition and averaging of the length of the vector according to the average from the individual vectors. The execution of the projection method is preferred.

After the projection method, the resulting vector (equals reset vector s) is determined from the penetration depth vectors $s_i$ (see image 3) by determining the sum vector $s_{sum}$ from the vector addition, wherein the length of the reset vector s results from the respectively longest projection of all of the penetration depth vectors $s_i$ on the sum vector $s_{sum}$. With reference to the details of carrying out the method, reference is made to Petersik et al., which is thus made a part of the disclosure of the instant invention by referencing the same. PCP $T_{0\ intermediate}$ is now displaced by the reset vector s and leads to the PCP $T_0$. The case differentiation is thus completed.

The TCP is now pushed in the direction of the proxy position PCP $T_0$. For this purpose, a counterforce, expressed by the vector TCP $T_0$, is exerted, wherein, in the simplest approximation, a factor, which is proportional to the length of this vector, defines the reset force.

According to a particular embodiment of the invention, the reset force is defined by means of an evaluation of the object marks of the virtual object, which are in contact with the points $P_i$ of the proxy $T_{0\ intermediate}$, so as to differentiate soft and hard objects. In a first approximation, this can take place by means of averaging, if applicable also in a weighted manner, from the reset force factors, which are assigned to the different object marks. For this purpose, the object marks, e.g., the voxel, are provided with information for the reset force and the respective reset force factor, respectively.

When the reset vector s, comprising the penetration depth and direction, is computed, the position, which the tool would have reached in reality with reference to the penetration into the body, is known. The position is the position of the proxy $T_0$.

Contrary to the proxy method presented in Petersik et al., this method prohibits new computing positions for the proxy, which are spaced apart from the old proxy to the extent that individual vectors $n_i$ are completely located in the clearance behind an object so that it becomes impossible for the object to be pushed through, in particular with thin surfaces. Furthermore, the computation is highly accelerated because the proxy position for each time step must be computed only once by the displacement by $n_i$.

Haptic Simulation of Material Removal

For weak force feedback devices, it is often necessary to avoid an unrealistically rapid material removal, which does not correspond to the actual ratios and which comes about in that the force feedback of the input device does not provide a sufficiently high resistance in response to a force effect, which is too high.

For this purpose, a further proxy, which is defined as a material removal proxy for the purposes of this invention and the position of which is pinpointed by the MCP (material removal proxy center point), is defined in addition to the above haptic proxy. The MCP is computed as a linear combination from the respective PCP and TCP, which is current at a certain point in time, wherein, due to the computational efforts, a time pattern is typically chosen for this, which is slower than the time pattern of the new definition of the PCP, e.g., slower by a factor of from 20 to 100, in particular 30 to 70.

The linear combination comprises a linear weighting of the positions PCP (haptic) and TCP (MCP=a×TCP+(1−a)×PCP with a from 0 to 1). a is a measure for the material removal speed and is typically relatively small (e.g. smaller than 0.1). Finally, the hardness of the material, which is in contact with the tool, and thus the material removal speed, is defined by a.

The haptics process and the material removal process run simultaneously, wherein the material removal process defines the surface of the object and the haptics process reacts to the changed surface and the PCP, in particular the PCP $T_0$, is positioned accordingly. The MCP and the expansion of the material removal proxy have the effect, in the event of an object defined by voxels, that the marks assigned to the individual voxels which are in contact with the material removal proxy and which are filled by it, respectively, are changed from "not removed" to "removed" for the purpose of labeling the voxel so as a result, the change is codified at the shape of the object, which is to be processed and that the proxy finds a new surface dipping position within the possible displacement region $n_i$ for PCP $T_{0\ intermediate}$.

To ensure a stable perception of the haptics, frequencies of above 800, in particular about or above 1000 Hz must be ensured. However, the material removal proxy must not be newly computed with this speed. Time intervals, which are oriented on the visual perception with reference to their frequency, that is, frequencies of greater than 20 Hz, preferably 25 to 100 Hz, are sufficient for this purpose.

The concept of the invention is further described by means of the figures, without being limited thereto.

Figure 1:
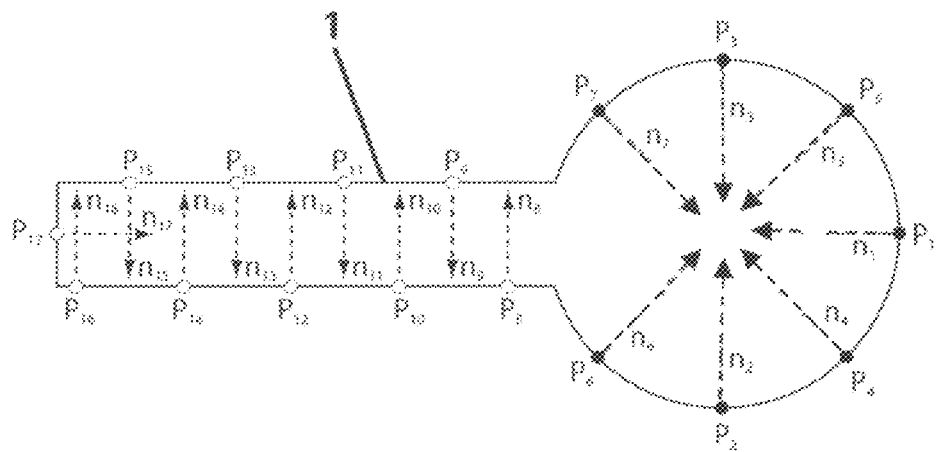
FIG. 1 shows the representation of the tool.

The surface of the tool (1) as illustrated in FIG. 1 is defined by a plurality of points $P_1$ to $P_{17}$. A vector $n_1$ to $n_{17}$, which stands at right angles (surface numeral) on the surface and which is oriented inwards, starts at each of the points $P_1$ to $P_{17}$. The number of points, the position of which and the length of the vectors were created during the design of the tool. As a result, they are advantageously distributed across the tool. A relative accumulation of points can take place for the active region (not illustrated). As is illustrated, all of the vector end points are located within the tool. In the instant case, the tool has the shape of a ball cutter, as is used in otolaryngology as bone cutter for access to the middle ear.

Figure 2:
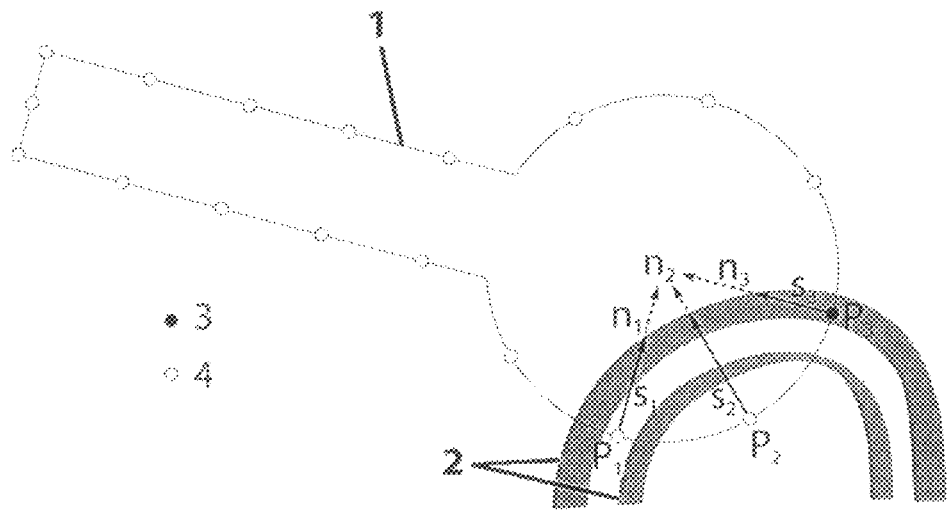
FIG. 2 shows the computation of the penetration direction.

FIG. 2 shows the interaction of the tool (1) with a thin, two-layer object (2), which encompasses a cavity. To simplify matters, instead of points $P_1$ to $P_{17}$ and vectors $n_1$ to $n_{17}$, only points $P_1$ to $P_3$ and vectors $n_1$ to $n_3$ are represented, which are numbered and which correspond to points $P_2$, $P_4$ and $P_1$ from FIG. 1. The same applies to the vectors $n_i$.

To simplify matters, the further points and vectors are not illustrated. The situation of the penetration of the object (2) by means of the tool (1) and the surface collision of the point $P_3$ is expressed as full point (3) for $P_3$. The points $P_1$ and $P_2$ are illustrated as hollow points (4), because they do not encompass an object collision. According to the method as known from the state of the art, these points are not included in the computation of the proxy positions, as described by the PCP, which, according to the insights of the instant invention, leads to an unrealistic haptic rendering for thin or hollow objects.

Starting from the vector end point, the vector $n_i$ is scanned until a collision with the surface of an object is determined or until the end point $P_i$ has been reached. According to this method, partial vectors, identified as penetration depth vectors $s_1$ to $s_3$, are identified. They originate in the respective points $P_i$ and extend to the respective surface collision point along the vectors $n_i$.

Figure 3:
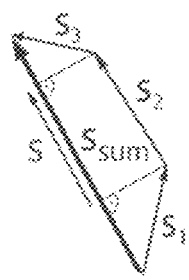
FIG. 3 shows the application of the projection method.

As is illustrated in FIG. 3, the sum vector $s_{sum}$ is now formed by means of vector addition from the penetration depth vectors $s_1$ to $s_3$. All of the penetration depth vectors $s_i$ are projected on the sum vector $s_{sum}$ and the longest projection leads to the reset vector s. In the instant case, this is the projection of the vector $s_2$.

Figure 5:
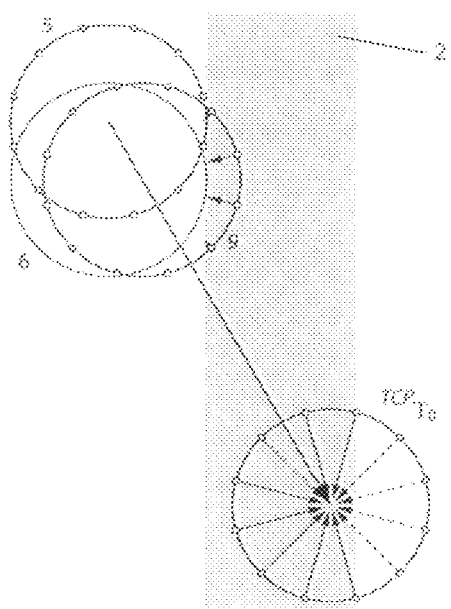
FIG. 5 shows the proxy method according to the invention and FIG. 6 shows the volume modification by proxy.

FIG. 5 illustrates a typical situation, in which the tool has penetrated deep into the object (2) and the proxy $T_0$ (6) is computed anew. The proxy $T_{-1}$ (5), the proxy $T_{0\ intermediate}$ (9) and the proxy $T_0$ (6) each have non-illustrated PCPs.

Starting from a start position (TCP $T_{-1}$) to which the TCP corresponds with the PCP $T_{-1}$ (5) (no surface contact), the tool penetrates the object within the observed time segment and assumes the position TCP $T_0$. It is necessary for such a situation to compute the PCP anew so that the proxy does not penetrate the object. A proxy$_{intermediate}$ (9) is created for this purpose. The proxy $T_{0\ intermediate}$ results from the proxy $T_{-1}$ by displacing the PCP $T_{-1}$ (5) in the direction TCP $T_0$ by maximally the length $n_i$, but not further than TCP $T_0$. This results in the PCP $T_{0\ intermediate}$ (9).

In case of very small penetration depths of the tool, TCP $T_0$ and PCP $T_{0\ intermediate}$ can thus coincide so that the PCP $T_{0\ intermediate}$ reaches the TCP $T_0$, but does not exceed it (not illustrated) in response to the displacement by the length $n_i$ and by a fraction of the length of $n_i$, respectively. In case of different lengths of the vectors $n_i$, the length of the displacement of the PCP $T_{0\ intermediate}$ as compared to PCP $T_{-1}$ corresponds to the length of the shortest of all of the vectors $n_i$ of the tool.

The proxy at the point in time $T_0$ can now be computed by applying the method described in FIG. 2 at the position PCP $T_{0\ intermediate}$, that is, the reset vector s is computed for the PCP $T_{0\ intermediate}$ and the PCP $T_{0\ intermediate}$ is displaced by the reset vector s and thus reaches the position PCP $T_0$ of the proxy at the point in time $T_0$ (6).

Proportionally to the distance PCP $T_0$ and TCP $T_0$, the force feedback coupling device exerts a reset force in the direction of the PCP $T_0$. The resulting force from the force exerted by the user on the tool and the reset force cause the proxy to slide along the surface. The respective proxy $T_0$ and not the TCP $T_0$ are depicted as tool.

Figure 4:
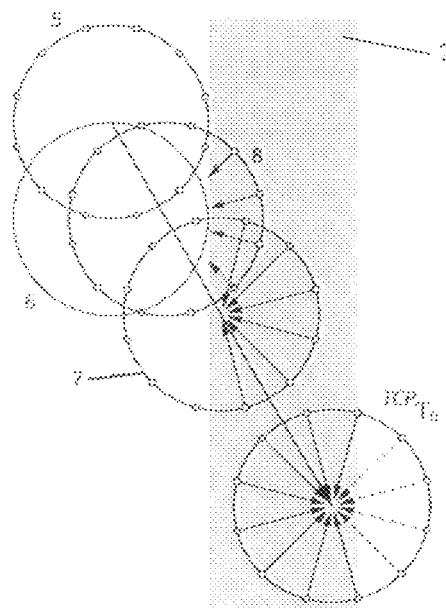
FIG. 4 shows the proxy method according to Petersik et al. (state of the art, comparative example)

The method known from the state of the art (Petersik et al.) is illustrated in FIG. 4. Here, it is no longer possible to find a surface for one or a plurality of search vectors in response to a strong tool-object penetration. According to this method, the path between proxy $T_{-1}$ (5) and TCP $T_0$ is halved and a new computation attempt is carried out at this position (7). This can be repeated as often as required up to an iteration depth, which is to be specified (8). When it is finally possible to compute a new position (6), the proxy is set to this position (6), otherwise it remains at the old position (5). Due to the necessary computation attempts and iterations, the computational effort is high and the tunneling of objects cannot be prevented.

Figure 6:
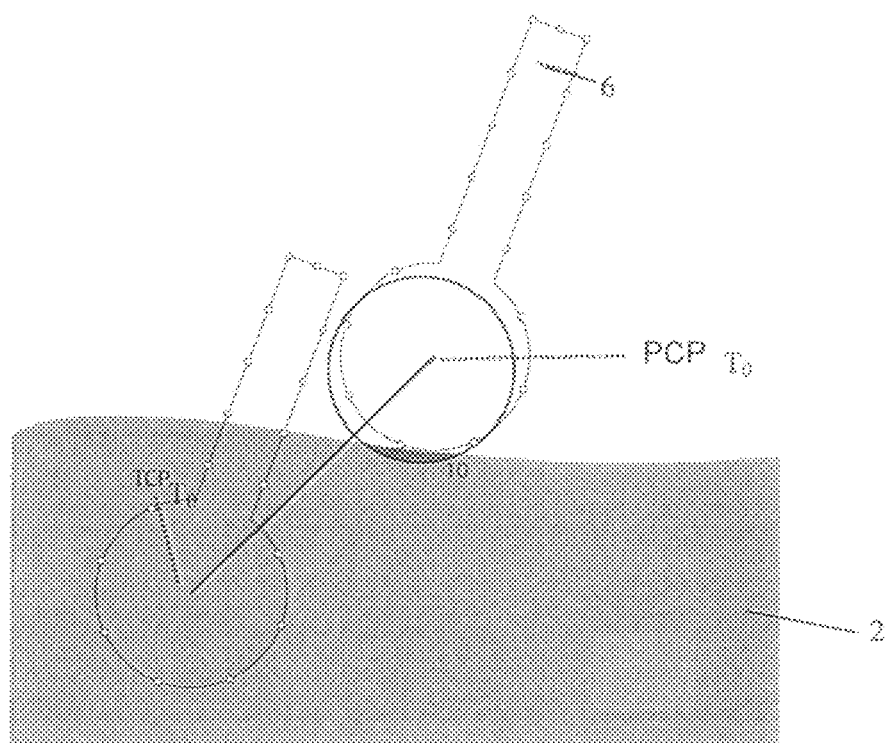

FIG. 6 shows the haptic simulation of a material removal. A material removal proxy (10) is a further copy of the tool and is pinpointed by its MCP (material removal proxy center point). The MCP is computed as linear combination from the PCP $T_0$ and TCP $T_0$, which is current in each case at a certain point in time. The linear combination includes a linear weighting of the positions PCP and TCP (MCP=a×TCP+(1− a)×PCP) with a from 0 to 1). a is the measure for the material removal speed and is approximately 0.05 in the instant case.

The MCP and the expansion of the material removal proxy (10) cause the object (2) to be illustrated as being removed to the extent in which the material removal proxy (10) intersects the object so that the form changes of the object (2), which is to be processed, is codified. The new form is considered for the next computation of the PCP.

Further details with reference to the method according to the invention and for the execution thereof can furthermore be found in the publication: Andreas Petersik: *Realistische haptische Simulation materialabtragender chirurgischer Eingriffe. Fortschritte in der Robotik* (realistic haptic simulation of material-removing surgical procedures), volume 11, Shaker Verlag, Aachen, 2007. ISBN 978-3-8322-6451-2 (at the same time dissertation, Carl-Friedrich-Gauβ-Fakultät, Technische Universität Braunschweig), which are hereby expressly included in the disclosure content of this application.

The invention claimed is:

1. A computer-implemented method for simulating the haptic interaction of a tool guided by a user with a virtual three-dimensional object, wherein the tool has a surface and is guided by means of a force feedback device, said method comprising computer-implemented steps, said steps comprising:
   a) defining a plurality of points $P_i$ on the surface of the tool, or at least on the surface of an active region of the tool, wherein the active region is the region of the tool, which can be brought into contact with the object during the method, with vectors $n_i$ having starting points at each of the points $P_i$ and end points arranged within the tool, said vectors $n_i$ are being placed at right angles on the surface and are oriented inwardly,
   b) defining a copy of the tool as a proxy, said proxy being an identical duplication of the tool, at least with reference to the points $P_i$ and the vectors ni,
   c) defining a position of the tool by a tool center point (TCP) and a position of the proxy by a proxy center point (PCP),
   d) defining a starting position of the PCP at a time $T_{-1}$ for which no end point of the vectors $n_i$, has contact with the object,
   e) bringing the tool into contact with the object comprising penetration of the object, thereby forming a position of the TCP at a time $T_0$,
   f) determining a new position of the PCP at the time $T_0$ from the position of the proxy at the time $T_{-1}$ and of the tool at the time $T_0$, by determining the PCP at the time $T_{0\ intermediate}$ on a connecting line between the PCP at the time $T_{-1}$ to the TCP at the time $T_0$ and at a distance from the PCP at the time $T_{-1}$ of maximal one length of a vector $n_i$ or of a fraction of one length of vector $n_i$, wherein the distance is defined as displacement length l,
   g) wherein determining the new position of the PCP at the time $T_0$ is made by means of a case-by-case analysis as follows:
   g.1) if at least one end point of a vector $n_i$ of the proxy dips into the object at the position of the PCP at the time $T_{0\ intermediate}$, the position PCP at the time $T_0$ is defined as position PCP at the time $T_{-1}$, otherwise,
   g.2) the vectors $n_i$ are scanned until a point of intersection with the surface of the object is found, which results in penetration depth vectors $s_i$ between points $P_i$ and the point of intersection and the penetration depth vectors $s_i$ have a direction of the vectors $n_i$, a reset vector s is computed from the penetration depth vectors $s_i$, wherein the direction of the reset vector s results from a sum of the penetration depth vectors $s_i$ and
   PCP $T_{0\ intermediate}$ is displaced by the reset vector s and results in PCP at the time $T_0$, and
   h) the force feedback device exerts a force in the direction of TCP at the time $T_0$ to PCP at the time $T_0$.

2. The computer-implemented method of claim 1, wherein the PCP at the time $T_{-1}$ and the TCP at the time $T_{-1}$ coincide for the starting position.

3. The computer-implemented method of claim 1, wherein steps e) to h) run repeatedly.

4. The computer-implemented method of claim 1, wherein the tool and object are illustrated graphically and the motion of the tool is represented by the proxy.

5. The computer-implemented method of claim 1, wherein the length of the reset vector s is computed by means of the projection, vector addition or averaging of the penetration depth vectors $s_i$.

6. The computer-implemented method of claim 1, wherein in step g.2) the vectors $n_i$ are scanned gradually, starting at the respective each end point to the point $P_i$ until in each case a first point of intersection with the object is found on the vector $n_i$ defining the penetration depth vectors $s_i$.

7. The computer-implemented method of claim 1, wherein the displacement length l corresponds to the length of the shortest of all of the vectors $n_i$.

8. The computer-implemented method of claim 1, wherein the object is defined by a mathematical function, or by means of volume model comprising a plurality multitude of voxels.

9. The computer-implemented method of claim 1, wherein the force feedback device exerts a force in a direction of the TCP at the time $T_0$ to the PCP at the time $T_0$ proportional to a distance of the TCP at the time $T_0$ to the PCP at the time $T_0$.

10. A computer-implemented method for simulating the haptic interaction of a tool guided by a user with a virtual three-dimensional object having a surface, wherein the tool is guided by means of a force feedback device and wherein the object experiences a material removal, on the surface due to the interaction of the tool with the object, said method comprising computer-implemented steps the steps comprising:
   A) applying a haptic proxy guided as a first representation of the tool, the haptic proxy having a position on the surface for the tool of the three-dimensional object, B) providing a further proxy, named material removal proxy as a further representation of the tool, having a position pinpointed by a material removal proxy center point (MCP), C) defining a position of the material removal proxy by linear combination of the position of the haptic proxy and the position of the tool guided into the object, each effective at the same point in time, D) removing material from the object in a region of the intersection of the material removal proxy with the object thereby generating a new surface of the object due to the material removal, E) updating the position of the haptic proxy in order that the haptic proxy maintains a position on the surface of on the object wherein the position of the haptic proxy is on the surface newly formed by the material removal wherein the MCP pinpointing the material removal proxy is provided by a linear combination of the PCP at the time $T_0$ and the TCP at the time $T_0$, each at a certain point in time, using a linear weighting of the positions of the PCP and of the TCP according to the formula:

$$MCP = a \times TCP + (1-a) \times PCP,$$

with a from 0 to 1, wherein a is a measure for characteristics material hardness, material removal speed and/or sharpness of the tool or an averaged or weighted combination of these variables, wherein 0 stands for hard and 1 for soft, wherein 0 stands for low removal speed and 1 stands for high removal speed and, wherein 0 stands for small sharpness and 1 stands for great sharpness.

11. The computer-implemented method of claim 10, wherein the haptic proxy and the material removal proxy are computed in two processes, wherein at least 500 haptic proxy positions per second are computed for detecting the haptic and 5 to 200 positions of the material removal proxy are computed per second for detecting the material removal.

12. The computer-implemented method of claim 10, wherein the simulation of the haptics and a definition of the haptic proxy takes place by means of a method according to one of claim 1.

13. The computer-implemented method of claim 10, wherein independent of one another, a is an averaged or weighted combination of the variables as follows:

hardness of the material is defined by a hardness attribute of a volume element and of the or an averaged hardness of the volume elements, which is/are in contact with the PCP and is defined on a scale of 0 to 1, the material removal speed is defined by the removal speed of the tool, adjusted on the tool on a scale of 0 to 1 and/or the sharpness of the tool is defined by a variable between 0 and 1, which is determined for the chosen tool.

* * * * *